May 26, 1931. C. S. BUSINGA 1,806,889
TRAILER VEHICLE
Filed May 16, 1930
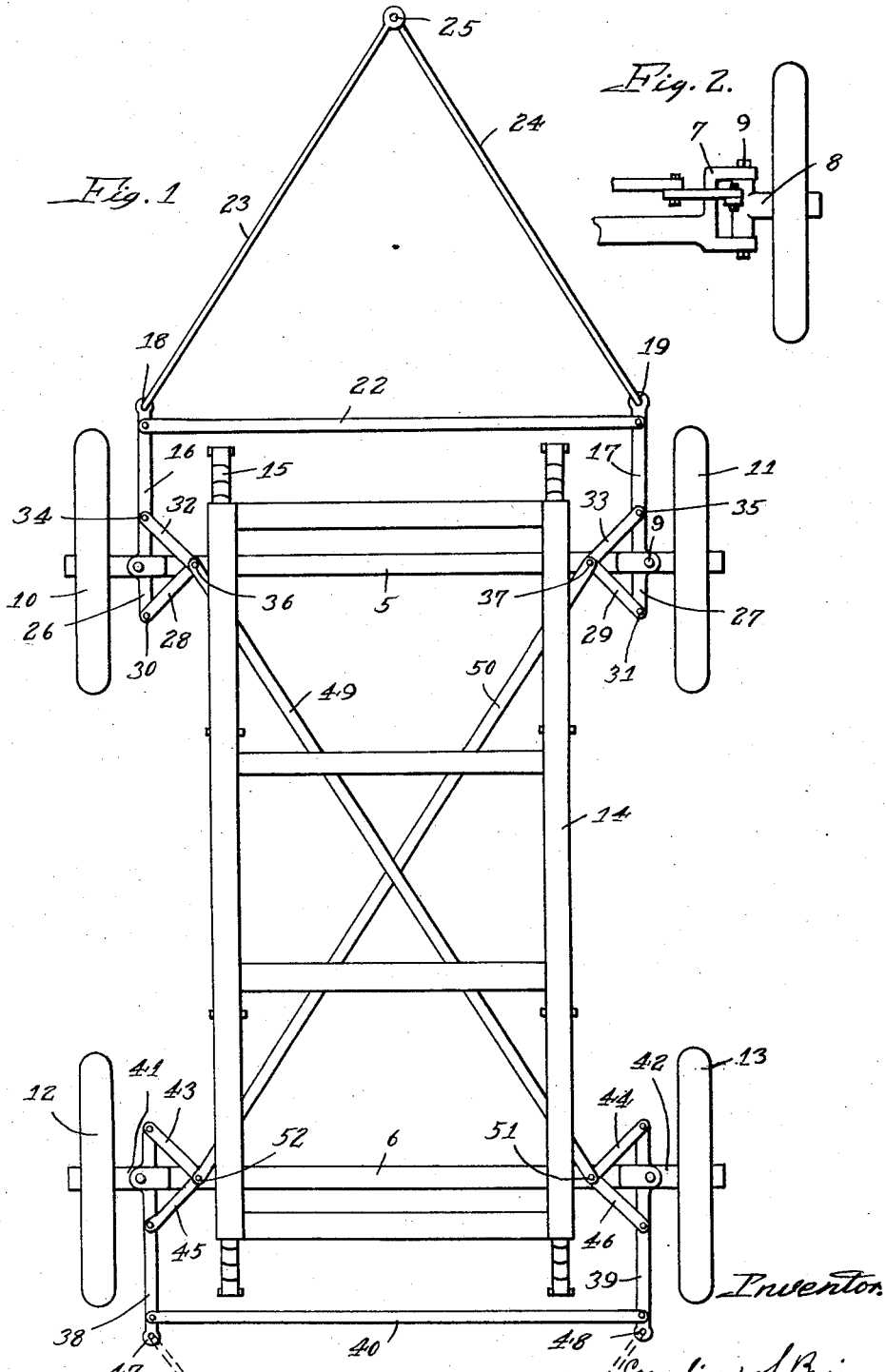

Patented May 26, 1931

1,806,889

UNITED STATES PATENT OFFICE

CORNELIUS S. BUSINGA, OF ROCKFORD, ILLINOIS

TRAILER VEHICLE

Application filed May 16, 1930. Serial No. 452,873.

My invention relates to vehicles and has special reference to vehicles of the so-called trailer type adapted to be drawn behind a suitable vehicle such, for instance, as behind a pleasure car, truck or the like.

While trailer vehicles of this character are well known, most of them are the result of complicated and expensive structure. This is particularly true in those trailers which are so constructed as to cause the wheels thereof to follow in the tracks of the tractor vehicle. These constructions have invariably made use of separate and distinct drafting and steering mechanisms. This results in a comparatively high initial cost of manufacture.

I have aimed to provide a trailer vehicle wherein the drafting and steering is accomplished through one and the same mechanism.

Another object of the invention is the provision of a trailer vehicle which may be manufactured at a substantially smaller cost than those heretofore known.

I have also aimed to provide a trailer vehicle in which the four wheels thereof are each supported on a steering knuckle, each of which knuckles is provided with a combined drafting and steering triangle, the triangles being suitably interconnected by means of drafting and equalizing rods.

Other objects and attendant advantages will become apparent to those skilled in the art from the following description and the accompanying drawings in which—

Figure 1 is a top view of a trailer vehicle embodying my invention, and

Fig. 2 is a side view of one wheel and the end of one axle showing the manner in which the drafting and steering triangle is attached to the steering knuckle.

The invention contemplates generally the provision of substantially parallel front and rear axles each of which is provided at its ends with conventional steering knuckles. Wheels of suitable size and shape are positioned upon the steering knuckles and are arranged to be swung horizontally for the purpose of carrying the vehicle in the desired direction. Means are provided for turning each pair of wheels in parallelism and means are provided connecting opposite front and rear steering knuckles whereby the rear wheels may be swung in a direction opposite to that of the front wheels and to the same extent as the latter. The rear wheels are drawn through the last mentioned means, no other draft bar or drafting means being provided. A suitable frame may be positioned upon the axles and connected thereto through springs.

Referring now to Figure 1 the numerals 5 and 6 designate stationary front and rear axles similar to the conventional front axles of an automobile. Each end of each of these axles is provided with the customary axle fork 7 within which is positioned the customary spindle 8 and king pin 9. Wheels 10, 11, 12 and 13, of conventional design are suitably mounted upon each of the spindles 8. A frame 14 of suitable design may be supported upon the axles 5 and 6 through springs 15 of any suitable or desired type. Draft bars 16 and 17 are attached to each of the front spindles and project outward terminating in loops 18 and 19. The outer ends of the forwardly projecting portions may be bent inward slightly if desired, to permit greater clearance between the tires of the wheels and the bars. An equalizing rod 22 connects the draft bars 16 and 17 near their forward ends. Tongue rods 23 and 24 are attached to the loops 18 and 19 of the draft bars 16 and 17 respectively and converged at the point 25 where they are pivotally connected together, this point serving to connect the trailer vehicle to a suitable draft vehicle. It will thus be seen that the tongue rods 23 and 24 and the equalizing rod 22 are positioned to form a triangle which serves to draw the vehicle forward and assure that the wheels 10 and 11 will always turn with substantially the same angularity.

The rear ends of the draft bars 16 and 17 are extended rearwardly, as shown at 26 and 27, and have metal bars 28 and 29 fixedly attached to the rear end thereof at 30 and 31. A second pair of metal rods 32 and 33 are fixedly attached to the draft bars 16 and 17 forward of the king bar 9 as at 34 and 35 and are arranged to be fixedly attached to the opposite ends of the bars 28 and 29 at 36 and 37. Thus the rods 28 and 32 and the rods 29 and 33 are attached respectively to the draft bars 16 and 17 in such manner as to form a triangle therewith in which the king pins of the steering knuckles lie substantially at the center of the draft bar sides of the triangles, the apex of the triangles normally lying above the axle.

The rear axle 6 having rear wheels 12 and 13 is substantially identical with the axle just described whereby either end of the trailer may be employed as the front. Here again draft bars 38 and 39 having an equalizing bar 40 are attached to spindles 41 and 42 and are provided with bars 43, 44, 45 and 46, to form triangles in the manner just described. Tongue bars such as 23 and 24 may be attached to the loops 47 and 48 respectively of the draft bars 38 and 39 as shown in the dotted lines, when this is to be employed as the front of the vehicle.

The front and rear units are connected solely by means of the reach rods 49 and 50 which pivotally connect the apex of oppositely disposed triangles on the front and rear axles as shown in Figure 1. The reach rod 49 thus pivotally connects the point 36 of the triangle formed by members 28, 32 and 16 with the point 51 of the triangle formed by members 44, 46, and 39, while the reach rod 50 connects the point 37 with the point 52. In like manner the connection between the reach rods 49 and 50 and the triangles at 36, 37, 51 and 52 are of pivotal nature and permit the reach rods to move with respect to the triangle.

The rods 49 and 50 serve to draw the rear axle 6 and at the same time serve to steer the wheels 12 and 13. Thus when the point 25, which is the point from which the trailer is drawn, is moved toward the right facing Figure 1 the wheels 10 and 11 will be swung toward the right, that is, the angle between the front side of the axle 5 and the plane of the wheel 10 will become less than a right angle while the angle between the front side of the axle 5 and the wheel 11 will become correspondingly greater than a right angle, the equalizing bar 22 insuring that the amount of this change in angularity will be substantially similar for the two wheels. Such a movement of the point 25 will cause the forward end of the vehicle to be moved toward the right as it is drawn forward. However, with the movement of the wheels 10 and 11 just described the point 37, which forms the apex of the triangle 29, 33 and 21, will be moved forward on the arc of a circle of which the king pin is the center. With this forward movement of the point 37 the reach rod 50 will be moved forward substantially endwise. Such movement of the reach rod 50 will cause the point 52 to be moved forward on the arc of a circle, transmitting corresponding movement to the spindle 41 thus moving the forward side of the wheel 12 to the left. In like manner movement of the wheel 10 to the right causes the point 36 to be drawn backward drawing the reach rod 49 backward which in turn draws the point 51 backward moving the forward end of the wheel 13 to the left. The movement of the wheels 12 and 13 will cause the rear end of the trailer vehicle to continue in the path formed originally by the wheels 10 and 11. The energy for drawing the rear axle 6 is thus provided entirely through the rods 49 and 50 which also serve to guide the rear end of the vehicle.

The construction of my improved trailer vehicle will be seen to be remarkably simple. The component parts of the steering knuckle triangles are securely and fixedly attached together and fixedly attached to the steering knuckles. The reach rods 49 and 50 are pivotally secured to the triangles at the points 36, 37, 51 and 52. The draft bars 20 and 21, are pivotally secured together through the equalizing bar 22 and the draft bars 38 and 39 are pivotally secured together by the equalizing bar 40. It will be seen that this provides a construction which may be manufactured at a minimum cost. The structure is such as to permit the front axles and wheels of old and discarded automobiles to be conveniently used for preparing the trailer.

The construction is such as to permit the elimination of the reach of conventional character usually employed between the front and rear axles which serves to transmit drafting power from the front to the rear axle. In my improvement the rear axle 6 is drawn by means of the reach rods 49 and 50.

While I have thus described and illustrated the specific embodiment of my invention I am aware that numerous changes and alterations may be made without materially departing from the spirit and scope of the invention and I do not wish to be limited except as required by the prior art and the appended claims—

I claim:

1. In a trailer vehicle adapted to be drawn behind a tractor vehicle, having a frame and a pair of axles, either of which is adapted to serve as a front axle, steering knuckles on the ends of each axle, wheels mounted upon said steering knuckles, steering triangles fixedly attached at one side thereof, to each steering knuckle, whereby the apex of each triangle will move on an arc with horizontal movement of said wheels, draft bars fixedly attached to each steering knuckle arranged to project outward in pairs from each end of the vehicle, lateral equalizing bars connecting the outer ends of each pair of draft bars to cause said wheels to turn through equal degrees of angularity, reach rods pivotally connected to the apex of diametrically opposed steering triangles to transmit steering and drafting movement between said triangles, and tongue rods pivotally connected at one end to each of one pair of draft bars and pivotally connected together at their opposite ends to connect said trailer vehicle to a tractor vehicle.

2. The combination in a tractor vehicle having a pair of axles, steering knuckles at each end of the axles and wheels on said steering knuckles, of triangles fixedly attached to each steering knuckle, a pair of reach rods connecting the apex of diagonally opposite steering triangles adapted to steer and draw the trailing wheels, and means for maintaining the wheels attached to each axle in parallelism.

In witness of the foregoing I affix my signature.

CORNELIUS S. BUSINGA.